June 9, 1936. C. T. WALTER 2,043,681
DRIER CONVEYER
Filed Dec. 21, 1933 7 Sheets-Sheet 1
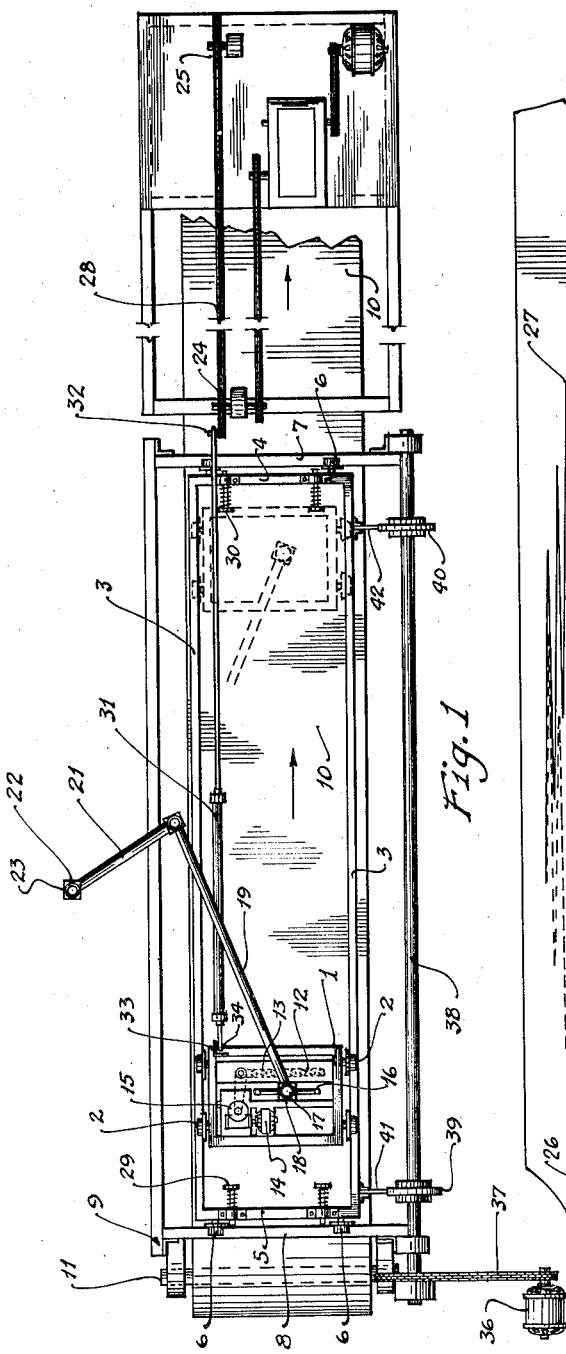
Fig. 1
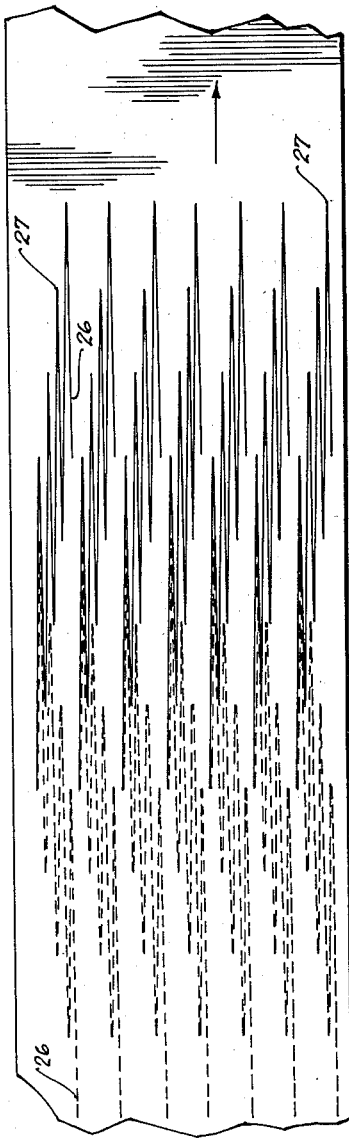
Fig. 2
Charles T. Walter
INVENTOR.
ATTORNEY.

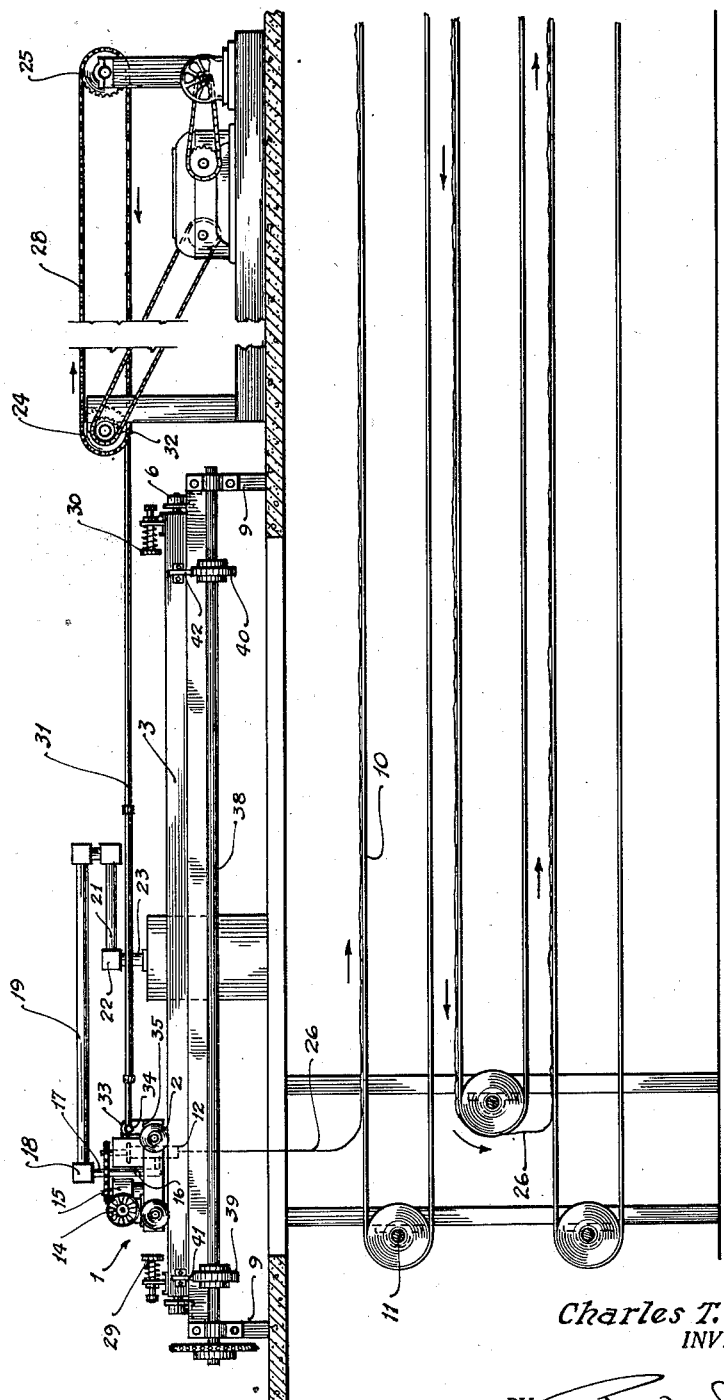

June 9, 1936.  C. T. WALTER  2,043,681
DRIER CONVEYER
Filed Dec. 21, 1933   7 Sheets-Sheet 3
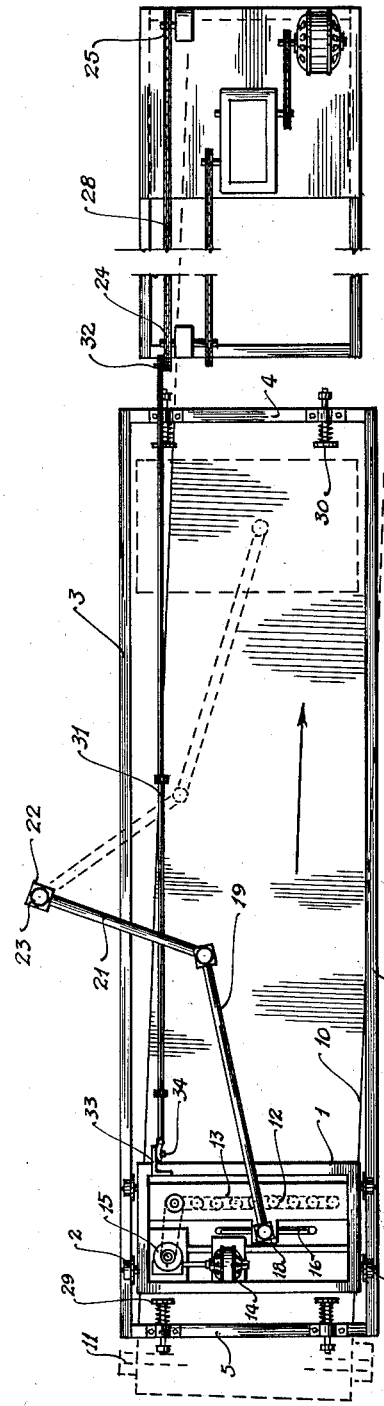
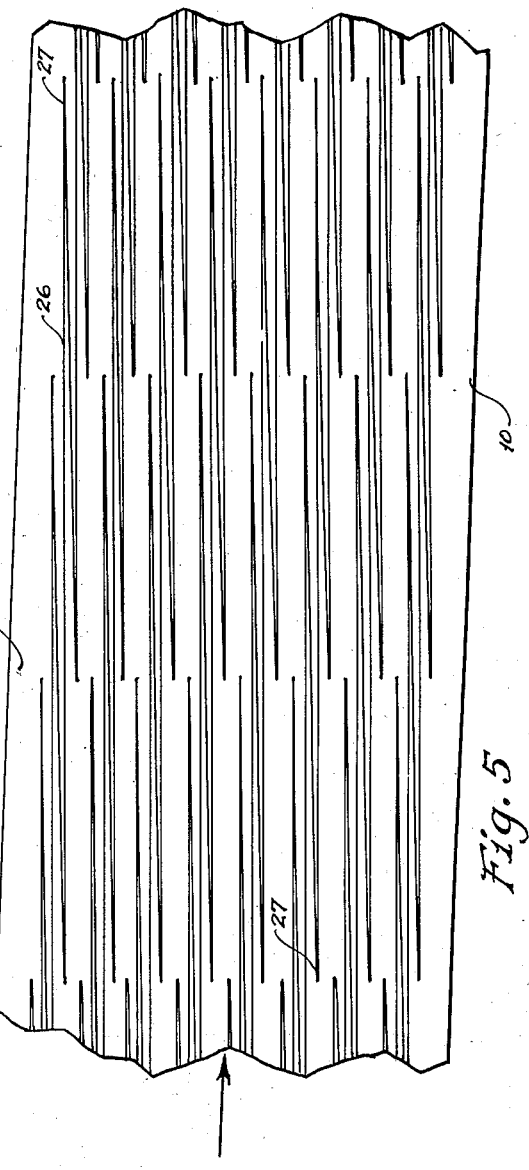
Charles T. Walter
INVENTOR.
BY
ATTORNEY.

June 9, 1936.  C. T. WALTER  2,043,681
DRIER CONVEYER
Filed Dec. 21, 1933   7 Sheets-Sheet 4
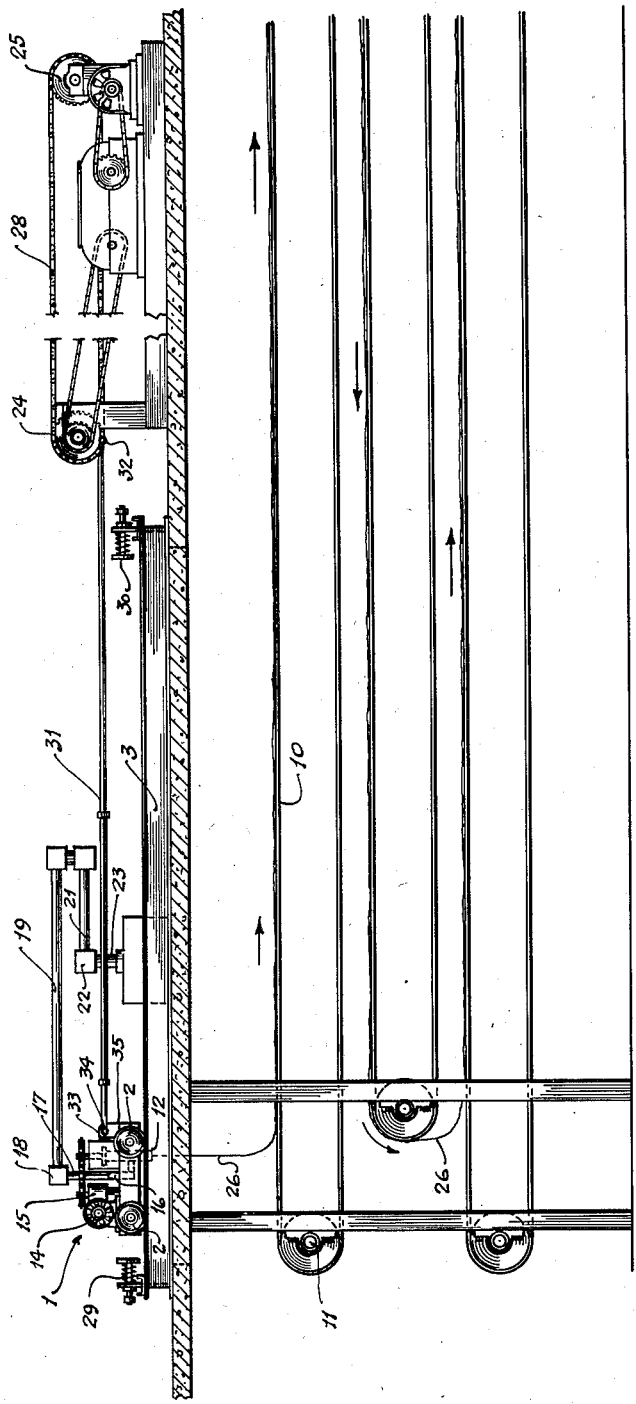
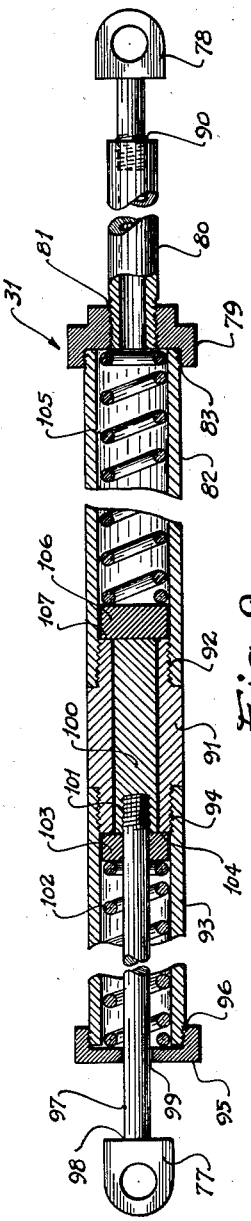
Charles T. Walter
INVENTOR.
BY
ATTORNEY.

June 9, 1936. C. T. WALTER 2,043,681
DRIER CONVEYER
Filed Dec. 21, 1933 7 Sheets-Sheet 6

Charles T. Walter
INVENTOR.

BY
ATTORNEY.

Patented June 9, 1936

2,043,681

UNITED STATES PATENT OFFICE 2,043,681

DRIER CONVEYER

Charles T. Walter, Chicago, Ill., assignor to Industrial Patents Corporation, Chicago, Ill., a corporation of Delaware Application December 21, 1933, Serial No. 703,348

13 Claims. (Cl. 34—12)

This invention relates to a device for use in the manufacture of soap such as is described and claimed in my copending application entitled Soap product and method of making the same, filed December 21, 1933, Serial No. 703,350.

One of the objects of the present invention is to provide a drier conveyer for conditioning soap tubes, ribbons or the like.

Another object of the invention is to provide means for placing such soap products on a conveyer for conditioning.

Another object of the invention is to provide an economical method for preparing such product.

Other objects of the invention will be apparent from the description and claims which follow.

No claim is made herein to the extrusion dies or nozzles herein disclosed by way of illustration as I describe and claim the invention involved in such extrusion dies or nozzles in my copending application entitled Extrusion device, Serial No. 703,351, filed December 21, 1933.

Referring now to the drawings:

Figure 1 is a plan view of one embodiment of the apparatus of the present invention.

Figure 2 is a plan view of the conveyer belt showing the pattern of deposited soap tubes as formed by the arrangement shown in Figure 1.

Figure 3 is a side view of the apparatus, the lower portion through the floor and the conveyer being in section.

Figure 4 is a plan view of another embodiment of the present invention.

Figure 5 is a plan view of a portion of the conveyer element showing the pattern of the soap tubes as formed by the arrangement shown in Figure 4.

Figure 6 is a side view of the device shown in Figure 4.

Figure 9 is a view partly in section of the connecting rod joining the carriage and driving chain.

Figure 7:
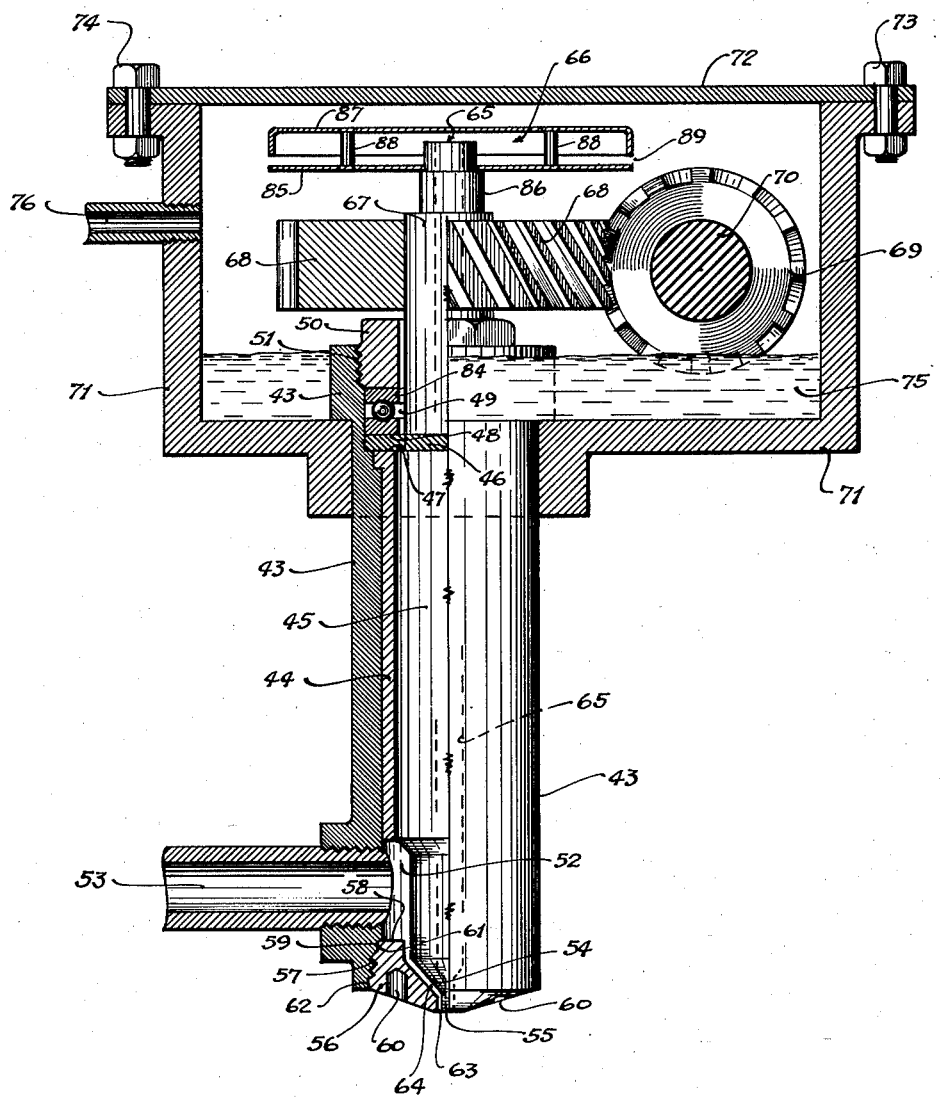
Figure 7 is a view partly in section showing an extrusion die and box from which the spindle of the die is driven.

I have found that in order to manufacture tubular soap in the form of uniform pieces in which the cut ends of the individual tubular elements are open and to avoid the production of a substantial quantity of splinters which are produced when the partially dried soap stock is too dry and brittle at the time it is cut, that it is necessary to spread the tubes, at the time they are extruded from the nozzle, on a suitable conveyer in substantially straight line formation with each strand of tube substantially isolated from adjacent strands.

The ideal arrangement would be to have each strand of tube laying on the conveyer in such a position that it would just touch the strand on either side of it. In other words, with this ideal arrangement we would have a single layer of tubes covering the conveyer screen without any loss of space on the conveyer and without the tubes piling one on top of the other. In practice this ideal condition is difficult to obtain but it can be approached closely so that for all practical purposes the conveyer screen is completely covered by a layer of tubular elements which are for the most part only one layer deep but which may occasionally be piled two deep.

I have found that in order to divide the continuous lengths of tubular elements into short elements of the desired length, it is necessary to cut them with a relatively sharp knife when they are in a suitable state of plasticity. I have found that this condition is best arrived at by subjecting the soap tubes to a current of relatively dry heated air, for example, air at a temperature of 125° F. and with a relative humidity of about 10%. When soap tubes are subjected to these conditions for a period of time they dry out and become mechanically rigid and strong. At a certain point of dryness they may be cut into short lengths without flattening the ends and without shattering the tubes into long splinters. If the cutting operation is carried out before the tubes have dried out or hardened to a sufficient degree, the ends become flat and we no longer have open tubular sections. On the other hand, if the tubes are cut after they have become too dry, there is a tendency to shatter them into small splinters. The range of dryness in which cutting may be done satisfactorily is sufficiently broad to lend itself to ordinary commercial drying operations.

I have found that soap stocks of different formulas require different times for the drying process. Depending on the formula and the air conditions, the drying time may take from four to twenty minutes.

In the manufacture of soap in this form it is desirable to have each extrusion nozzle produce as much volume per unit of time as possible. This tends to reduce the number of nozzles required for a given amount of production. Soap produced in this form is extremely light in weight per unit of length. For example, a soap tube having a diameter of .09″ and a wall thickness of .0045″ measures about 1800 feet per pound in a wet condition. In other words, a nozzle extruding a soap tube of these dimensions at the rate of one foot per second, will produce about two pounds per hour. We find it practical to operate these extrusion nozzles at a speed of 6 to 8 feet per second or higher. These speeds represent a reasonable capacity.

In order to provide a sufficiently long period of time in the drier when the drier is designed along conventional lines in which there are a limited number of passes of conveyer belt through the drier, it is necessary to run these conveyer belts at a reasonably slow speed. In order to meet our first requirement of having the soap tubes laid on the conveyer screen in substantially straight line formation with the strands not unduly overlapping each other, it is necessary to produce a differential velocity effect between the speed of the conveyer screen through the drier and the extrusion velocity of the nozzles. This differential velocity is obtained by the apparatus hereinafter described.

Referring now particularly to Figure 1:

The carriage 1 is mounted on wheels 2 adapted to roll upon rails 3. The rails are preferably made of channel iron or other suitable structural sections tied together at their ends by cross members 4 and 5. Cross members 4 and 5 are attached to wheels 6 which are free to move along rails 7 and 8. The rail assembly is supported by a framework 9, shown more clearly in Figure 3. A conveyer belt 10 is mounted beneath the rails as on shaft 11 and moves in the direction of the arrows at a uniform linear velocity. A plurality of extrusion dies 12 is mounted upon carriage 1. Each of the dies is equipped with a rotating spindle, all of the spindles of a group being driven by chain 13. Power from motor 14 is transmitted to chain 13 through speed reducer 15.

Soap stock in plastic form is supplied to the dies 12 through manifold 16 which terminates in a vertical pipe 17 equipped with a suitable swivel joint 18 which connects it to pipe line 19. Pipe line 19 is connected by means of a swivel joint with pipe link 21. Pipe link 21 is joined by swivel joint 22 to stationary pipe 23. Pipe 23 leads to a soap supply system not shown. Through this linkage system soap stock in plastic condition may be pumped to the dies on the moving carriage 1 without danger of volume change in the system as the carriage moves between its extreme limits.

In operation, carriage 1 is moved back and forth along rails 3 at a uniform velocity except, of course, at the end points of travel, at a speed equal to the extrusion rate of the dies. Simultaneously, the conveyer 10 is moved at a relatively slower velocity, the two motions combining to lay continuous lengths of tubing extruded from the dies on conveyer 10 in overlapping relationship.

It will be apparent that the length of the path of travel of carriage 1 is determined by the distance between sprockets 24 and 25 and the acceleration at the ends of the stroke will be determined by the diameters of these sprockets and their speed of rotation. It is desirable to have carriage 1 reverse its direction of motion at the ends of the stroke at a reasonably rapid rate in order to avoid a piling-up of the extruded tubes 26 at the turns 27. Any tendency for the tubes to pile up at the turns is greatly reduced by making the distance between the extrusion nozzles and the receiving conveyer substantial in amount, for example, three or four feet.

In order to relieve the driving chain system 28 from the forces involved in decelerating and accelerating the mass of carriage 1, spring buffers 29 and 30 are provided. The buffers are so arranged as to absorb the energy of the carriage during deceleration and return it to the carriage during acceleration. For quiet operation, these spring buffers are equipped with air dash pots to decelerate the moving buffer ram gradually and avoid severe pounding and consequent noise.

By this arrangement carriage 1 is made to reverse its direction of travel without the imposition of undue stresses upon its driving mechanism.

Carriage 1 is driven by link 31 affixed to chain 28 by swivel 32 and to bracket 33 by swivel 34, bracket 33 being rigidly affixed to the carriage as at 35, as is clearly shown in Figures 3 and 6. The mechanism which has just been described will lay a pattern of tubes upon the conveyer such as is shown in Figure 2. In the arrangement shown in Figure 1, it will be seen that the motor 36 driving chain 37 will rotate shaft 38, causing cams 39 and 40 in contact with cam buffers 41 and 42 respectively, to oscillate the entire rail assembly thus giving a movement laterally of the conveyer.

Link 31, which serves as a connecting rod to join the carriage and the driving chain, is shown in detail in Figure 9. It will be noted that this connecting rod is spring loaded, thus permitting the carriage to travel a path the length of which may differ somewhat from the path of travel of the chain driving link. It will be readily apparent that if the spring buffers which serve to absorb the energy of the moving carriage are a fixed distance apart, there will be only one carriage speed at which the energy exchanged between the moving carriage and the spring buffers will cause the carriage to move through a distance equal to the distance traveled by the chain driving link.

At any other speed higher or lower than this value a completely balanced energy exchanged between carriage and springs can take place only if the carriage moves a greater or a lesser distance, depending upon whether the carriage is moving faster or slower than the optimum speed. With a solid connecting bar, if the positions of the spring buffers are not carefully adjusted in accordance with the speed of the carriage, undue stress will be transmitted to the chain drive mechanism.

The spring loaded connecting rod serves to reduce these unbalanced driving stresses to a certain predetermined maximum amount. With such a spring loaded connecting rod, if the spring buffers are set a certain distance apart and the carriage is moving at a speed slow enough so that the kinetic energy contained therein is insufficient to compress the spring buffers to a point where the path of travel of carriage will be as great as the path of travel of the chain driving link, the difference will be taken up by a change in the length of the spring loaded connecting rod, shortening of the spring loaded connecting rod at one end of the stroke and lengthening of the connecting rod at the opposite end of the stroke. On the other hand, if the speed of the carriage is such that the energy contained therein is enough to compress the springs an amount which will make the carriage travel a distance greater than the length of the path of the chain drive, the connecting rod will compensate for this difference by stretching at one end of the stroke and compressing at the other end.

In practice I have constructed this connecting rod so that it has an initial tension of about one hundred pounds, that is, a load greater than one hundred pounds in either direction will either shorten or lengthen the rod. One hundred pounds, therefore, represents the maximum initial force which may be transmitted to the chain driving mechanism.

It will be seen that the connecting rod 31 comprises a swivel end 77 which is attached to the carriage and a swivel end 78 which is attached to the chain. Collar 79 is threaded to link 80 at 81 and to housing 82 at 83. Link 80 is connected to swivel 78 at 90. Housing 82 is threaded to block 91 at 92. Housing 93 is threaded to block 91 at 94. Collar 95 is threaded to housing 93 at 96. Swivel 77 is secured to rod 97 at 98. Rod 97 enters housing 93 through aperture 99 in collar 95 and is threaded to piston 100 at 101. Coil spring 102 abuts the inner surface of collar 95 at one end and forces collar 103 against shoulder 104 of block 91 at the other end. Coil spring 105 abuts the inner surface of collar 79 at one end and forces collar or plug 106 against shoulder 107 of block 91 at the other end. It will be seen therefore, that a thrust applied to swivel 77 is translated through rod 97 and piston 100 which slides freely through block 91 to plug 106. Plug 106 which slides freely within housing 82 compresses coil spring 105. On the return movement, rod 97 is withdrawn partially, thus causing piston 100 to force collar 103 against spring 102, thus compressing spring 102.

In the form of the assembly disclosed in Figure 4, it will be seen that the rail assembly is fixed but inclined slightly to the direction of motion of the conveyer belt. This inclination of the tracks as shown in Figure 4 causes the extrusion dies to move along a diagonal line across the belt. This diagonal motion of the dies combined with the motion of the conveyer itself causes the tubes to be laid on the conveyer in a pattern such as is shown in Figure 5.

This pattern may be one hundred per cent efficient in utilizing the conveyer space. It will be noted that where the space between the nozzles and the length of the path of travel of the carriage are suitably proportioned, the conveyer screen may be completely covered.

The arrangement of the equipment shown in Figure 1 lays a pattern upon the conveyer about fifty per cent efficient from the standpoint of utilizing the space on the conveyer to the best advantage.

Therefore, although the arrangement shown in Figure 1, resulting in the pattern shown in Figure 2, is operative, the arrangement shown in Figure 4, resulting in the pattern shown in Figure 5, is preferred.

Attention is called to the fact that Figures 2 and 5 are both exaggerated as to the angle between the conveyer and the soap elements in order to bring out clearly the underlying theory.

Figure 10:
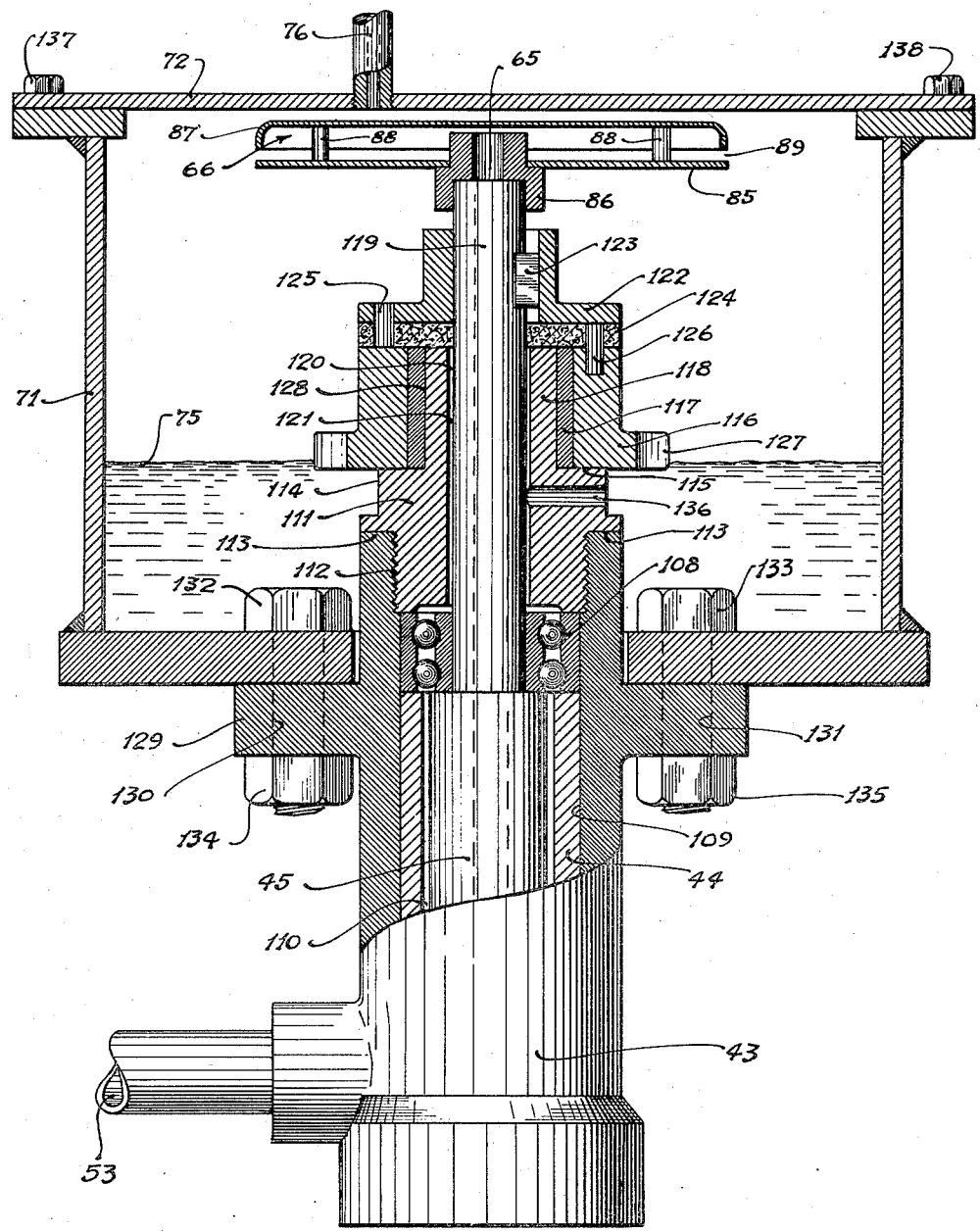
Figure 10 is a view partly in section through a portion of the die assembly shown in Figure 8.

Referring now more particularly to Figure 10 which is a view partly in section through a portion of the die assembly 12 showing one of the dies partly in section.

It will be seen by reference to this figure that die housing 43 is provided with a suitable bushing 44 and a rotatable spindle 45 running in bushing 44 as a bearing. It will be noted that bearing 108 is a double row combination radial and thrust ball bearing which performs the dual function of rotatably guiding the upper end of the spindle 45 and preventing its axial movement by virtue of the hydraulic pressure which is received from below.

Another ball bearing is positioned relatively close to the lower end of the spindle and is not shown, acting merely as a radial bearing to guide the spindle. Spacer bushing 44 is a cast iron bushing having a light press fit in the bore 109 of the body. It will be noted that there is a space 110 between the spindle 45 and spacer bushing 44.

Nut 111 which is screwed into casing 43 by threads 112, serves to carry the thrust transmitted through bearing 108. It will be noted that nut 111 is designed to screw down solidly against shoulder 113. Flat surfaces are preferably provided on the surface 114 of nut 111 to provide suitable bearing surfaces for a wrench. The upper extremity 115 of nut 111 is machined to a smooth surface to provide a bearing for sprocket 116 which contains a suitable bronze bushing 117.

Bushing 117 is designed to permit the sprocket 116 to rotate freely about a bushing portion 118 of nut 111. The driving end 119 of spindle 45 passes up through a concentric hole 120 in nut 111.

A slight amount of clearance between the driving end 119 of the spindle and nut 111 is indicated at 121. The amount of clearance is not important, it being merely desirable that driving end 119 of spindle 45 does not contact the surface of concentric hole 120 in nut 111 since nut 111 is not utilized as a bearing for spindle 45. A flange 122 is firmly attached to the upper end of spindle 45 by means of key 123. Leather washer 124 is provided to transmit driving force from sprocket 116 to flange 122 through driving pins 125 and 126. Pins 125 are firmly fastened in flange 122 and project into holes in the leather washer 124. Pins 126 are firmly fastened in sprocket 116 and project into holes in leather washer 124.

This construction provides a flexible connection between spindle 45 and driving sprocket 116. This flexible connection avoids the possibility of imposing a bending moment on the rotating spindle and the bearings in which it is mounted.

By virtue of this construction, all bending and shearing forces resulting from the chain drive on the teeth 127 of sprocket 116 are resisted by a bearing 128 and are transmitted directly to the rigid body of casing 43 and consequently only a pure torque is transmitted to the spindle.

A breather hole 65 runs the entire length of spindle 45 to the end of an extrusion pin not shown, which is positioned, of course, in a position similar to that shown in the extrusion nozzle depicted in Figure 7. The flange 129 is formed integral with casing 43 and is provided with holes 130 and 131 whereby the extrusion nozzle is bolted to box 71 by means of bolts 132 and 133 secured tightly in place by nuts 134 and 135.

Oil 75 in box 71 communicates with the interior of the extrusion device through a hole 136. Oil shield 66 consists of a metallic plate 85 mounted on a suitable extension 86 of spindle 45. Sheet metal hood 87 is fastened to and spaced from metallic plate 85 by posts 88. Posts 88 are of such length as to hold hood 87 a short distance 89 above metallic plate 85. This narrow annular opening 89 permits the ready passage of air into the space between plate 85 and hood 87 thence to the breather opening 65 in spindle 45.

However, very little oil can be splashed into the narrow opening 39 and such oil as does find its way inside the oil shield will be ejected, due to centrifugal force set up by the rotating oil shield rotating as it does with the spindle.

Figure 8:
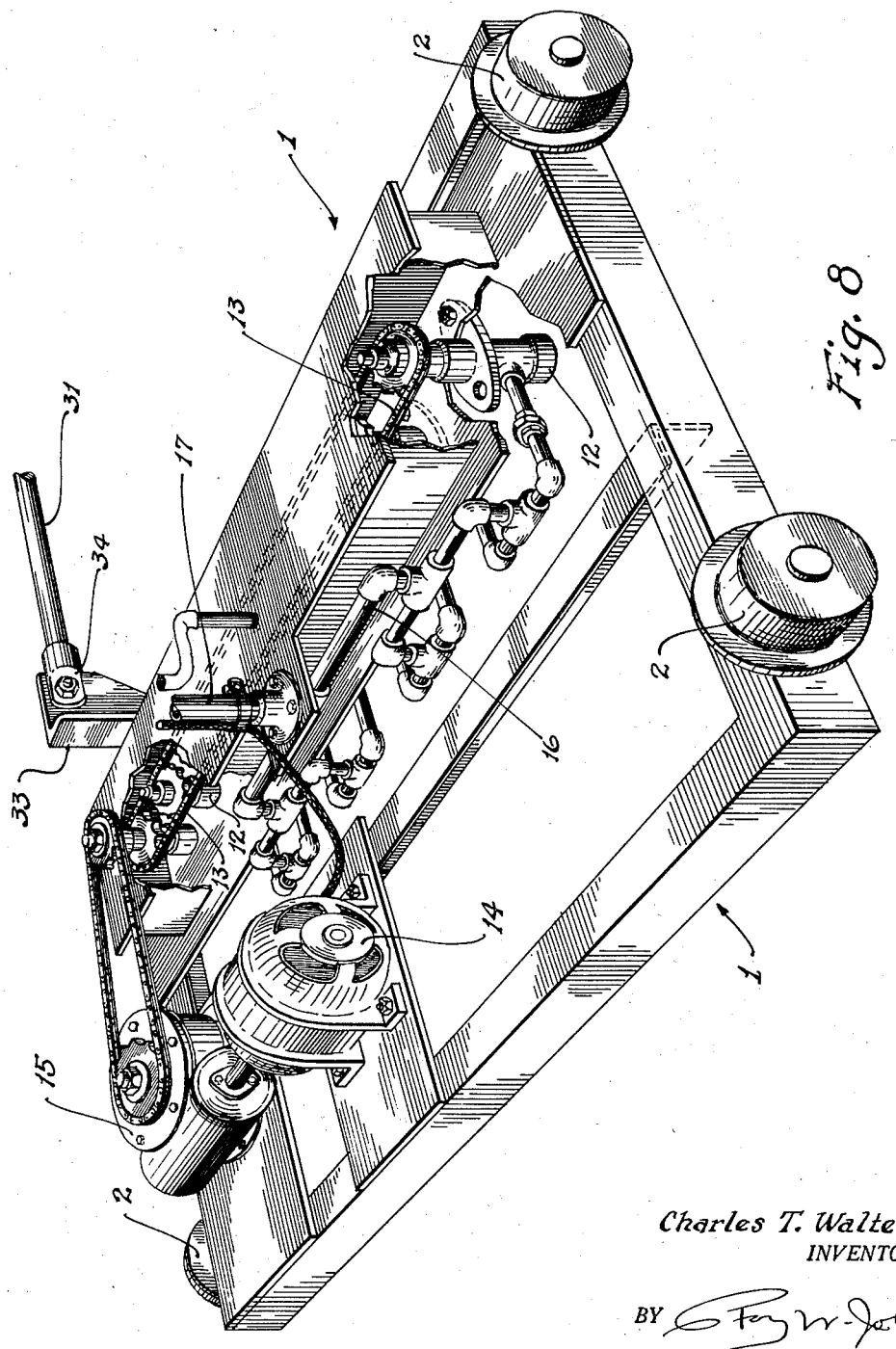
Figure 8 is a perspective view of the extrusion die carriage used in the apparatus of the present invention.

Sprocket 116 is driven by chain 13 shown in Figure 8. Box 71 is preferably air tight and supplied with air under pressure through inlet pipe 76 in order to supply air for the breather tube 65 in the formation of tube soap of the type described and claimed in my copending application entitled Soap product and method of making the same, filed December 21, 1933, Serial No. 703,350. The cover 72 of box 71 is held in place as by bolts 137 and 138.

Referring now more particularly to Figure 7, which is a view partly in section through a portion of a die assembly employing a gear drive, showing one of the dies partly in section:

It will be seen by reference to this figure that die housing 43 is provided with a suitable bushing 44 and a rotatable spindle 45 running in bushing 44 as a bearing.

Integral with spindle 45 is collar 46 provided to maintain the spindle 45 in a fixed position axially. Collar 46 operates against the top surface 47 of bushing 44 on one side and against lower ball race 48 of ball bearing 49 on the other side. Upper ball race 84 reacts against nut 50 threaded into housing 43 by threads 51. Spindle 45 is narrowed down slightly to provide chamber 52. Plastic soap enters under pressure through inlet 53. It will be noted that the lower end of spindle 45 terminates in a cone 54 and a pin 55. Plate 56 is threaded into the lower end of housing 43 by threads 57 and has a flat surface 58 which contacts with shoulder 59 of housing 43 to limit the distance to which plate 56 may be screwed. Plate 56 is provided with wrench holes 60. Surfaces 61 and 62 are guide surfaces to assure proper setting of plate 56. Plate 56 is provided with extrusion orifice 63 in which pin 55 is rotatable. It will be noted that the distance which plate 56 is inserted in the housing is such as to provide a clearance space in the form of a conical passage 64, connecting chamber 52 and orifice 63. The clearance between the die pin and the extrusion hole is preferably in the neighborhood of .005 of an inch.

Clearance of about .010 of an inch to .015 of an inch between the conical surface 54 and the plate 56, appears to be the optimum condition. It will be noted that a breather hole 65 extends throughout the length of spindle 45 and pin 55 protected at the top by oil shield 66, which is identical to the oil shield shown in Figure 10 previously described.

Integral with spindle 45 is extension 67 carrying gear 68. Helical gear 69 is mounted on shaft 70 and operates a plurality of die gears 68. Die body 43 is mounted in box 71 provided with cover 72 held in place as by bolts 73 and 74. Oil 75 bathes gear 69. The box 71 is preferably air tight and supplied with air under pressure through inlet pipe 76 in order to supply air for the breather tube 65 in the formation of tube soap of the type described and claimed in my copending application entitled Soap product and method of making the same, filed December 21, 1933, Serial No. 703,350.

It will be understood, of course, that the present invention is not limited to the particular type of die employed nor the particular product which may be formed by the equipment.

I claim:

1. A device of the character described, comprising a conveyer, rails mounted over said conveyer, a carriage movable upon said rails, a plurality of extrusion dies mounted in said carriage and arranged at intervals in a series disposed transversely of the conveyer, a manifold connected with said extrusion dies and with supply means, means for moving said conveyer and independent means for continuously moving said carriage back and forth lengthwise of the conveyer.

2. A device of the character described, comprising a conveyer, rails mounted over said conveyer, a carriage movable upon said rails, a plurality of extrusion dies mounted in said carriage, a manifold connected with said extrusion dies and with supply means, means for moving said conveyer and independent means for moving said carriage lengthwise of the conveyer, at a rate relatively greater than the movement of the conveyer.

3. A device of the character described, comprising a conveyer, rails mounted over said conveyer, a carriage movable upon said rails, means for driving said conveyer, means for driving said carriage at a relatively greater speed than the movement of the conveyer, a plurality of extrusion dies mounted in said carriage, a manifold mounted in said carriage to supply said extrusion dies, and a supply pipe connected to said manifold by a swivel joint, said supply pipe comprising a swiveled linkage system, said means being mounted over said conveyer substantially lengthwise therewith and inclined slightly at an angle thereto.

4. A device of the character described, comprising a frame, a conveyer mounted therein, rails mounted thereon, a carriage movable on said rails over said conveyer in a lengthwise direction, means for moving said conveyer, a plurality of extrusion dies mounted in said carriage, means for supplying material to said extrusion dies, means for moving said carriage relatively faster than the movement of said conveyer, and buffers at the ends of the rails to decelerate and accelerate the carriage at the ends of its path.

5. A device of the character described, comprising a frame, a conveyer mounted therein, rails mounted thereon, a carriage movable on said rails over said conveyer in a lengthwise direction, means for moving said conveyer, a plurality of extrusion dies mounted in said carriage, means for supplying material to said extrusion dies, means for moving said carriage relatively faster than the movement of said conveyer, said means for moving said carriage comprising a link swiveled thereto and a sprocket chain mounted upon sprocket wheels, said sprocket chain disposed parallel to the path of movement of the said carriage, and buffers at the ends of the rails to decelerate and accelerate the carriage at the ends of its path.

6. The method of drying material extruded in continuous strings which comprises placing simultaneously a transverse series of strings of said material in a zigzag path on a moving conveyer lengthwise thereof.

7. The method of drying extruded material which comprises placing such material in a transverse series of continuous strings longitudinally upon a moving conveyer, said strings being placed upon said conveyer at a relatively faster rate of speed than the movement of the conveyer in a continuous forward and rearward direction whereby individual strings of material are bent back upon themselves in lines substantially parallel to the direction of movement of the conveyer.

8. The method of drying extruded material which comprises placing such material in a transverse series of continuous strings longitudinally upon a moving conveyer, said strings being placed upon said conveyer at a relatively faster rate of speed than the movement of the conveyer in a continuous forward and rearward direction whereby individual strings of material are bent back upon themselves in lines diagonal to the direction of movement of the conveyer.

9. A device for preparing extruded plastic material in long strands comprising a conveyer movable in a fixed substantially horizontal path, a carriage, extruding means supported by the carriage above the conveyer, means for supporting and guiding the carriage including a track inclined laterally to the path of the conveyer, and means for moving the carriage back and forth in a fixed path longitudinally of the track.

10. A device for preparing extruded plastic material in long strands comprising a conveyer movable in a fixed substantially horizontal path, a carriage, means supported by the carriage above the conveyer for continuously extruding plastic material onto the conveyer, means for supporting and guiding the carriage including a track inclined laterally to the path of the conveyer, and means for moving the carriage back and forth in a fixed path longitudinally of the track.

11. A device for preparing extruded plastic material in long strands comprising a conveyer movable in a fixed substantially horizontal path, a carriage, a battery of extrusion nozzles supported by the carriage above the conveyer for continuously and simultaneously extruding plastic material onto the conveyer, means for supporting and guiding the carriage including a track inclined laterally to the path of the conveyer, and means for moving the carriage back and forth in a fixed path longitudinally of the track.

12. A device for preparing extruded plastic material in long strands comprising a conveyer movable in a fixed substantially horizontal path, a carriage, extruding means supported by the carriage above the conveyer, means for supporting and guiding the carriage including a track inclined laterally to the path of the conveyer, means for moving the carriage back and forth in a fixed path longitudinally of the track, and buffers associated with the track to decelerate and accelerate the carriage at the limits of its longitudinal movement.

13. A device for preparing extruded plastic material in long strands comprising a conveyer movable in a fixed substantially horizontal path, a carriage, a battery of extrusion nozzles supported by the carriage above the conveyer for continuously and simultaneously extruding plastic material onto the conveyer, means for supporting and guiding the carriage including a track inclined laterally to the path of the conveyer, means for moving the carriage back and forth in a fixed path longitudinally of the track, and buffers associated with the track to decelerate and accelerate the carriage at the limits of its longitudinal movement.

CHARLES T. WALTER.